Feb. 9, 1932.  C. A. BRAUN  1,844,837
AUTOMATIC SAW CUT-OFF
Filed Nov. 25, 1927  2 Sheets-Sheet 1
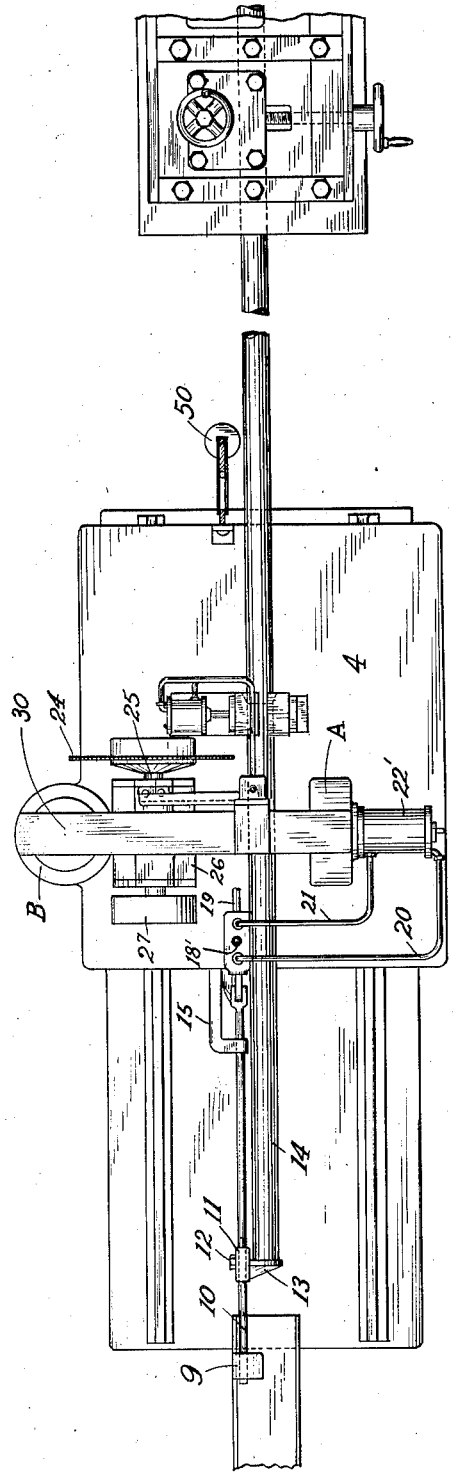
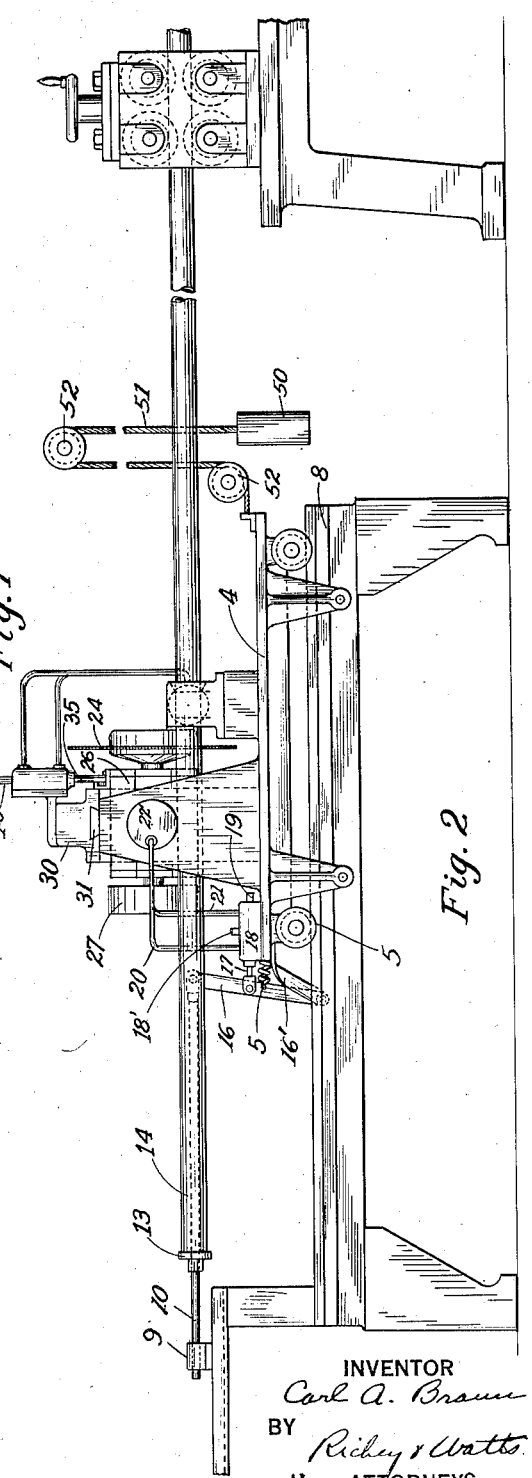
INVENTOR
Carl A. Braun
BY
Richey & Watts
His ATTORNEYS Feb. 9, 1932.   C. A. BRAUN   1,844,837
AUTOMATIC SAW CUT-OFF
Filed Nov. 25, 1927   2 Sheets-Sheet 2

Carl A. Braun
INVENTOR
BY Richey & Watts
HIS ATTORNEYS

Patented Feb. 9, 1932

1,844,837

UNITED STATES PATENT OFFICE

CARL A. BRAUN, OF TOLEDO, OHIO, ASSIGNOR, BY MESNE ASSIGNMENTS, TO STEEL AND TUBES, INC., OF CLEVELAND, OHIO, A CORPORATION OF OHIO

AUTOMATIC SAW CUT-OFF

Application filed November 25, 1927. Serial No. 235,465.

This invention relates to an apparatus for automatically severing moving objects such as tubes, rods and the like, into predetermined lengths.

An object of my invention is to prevent breakage of the severing means and other parts.

Another object of the invention is to utilize fluid under pressure to actuate means for automatically severing continuously moving objects such as tubes, rods and the like.

Other objects and advantages of my invention will become more apparent as the following description of one embodiment thereof progresses, reference being made to the accompanying drawings in which like reference characters are employed to designate like parts throughout the same.

In the drawings:

Fig. 1 is a top plan view of an apparatus embodying my invention;

Fig. 2 is a side elevation of the same.

Figure 3:
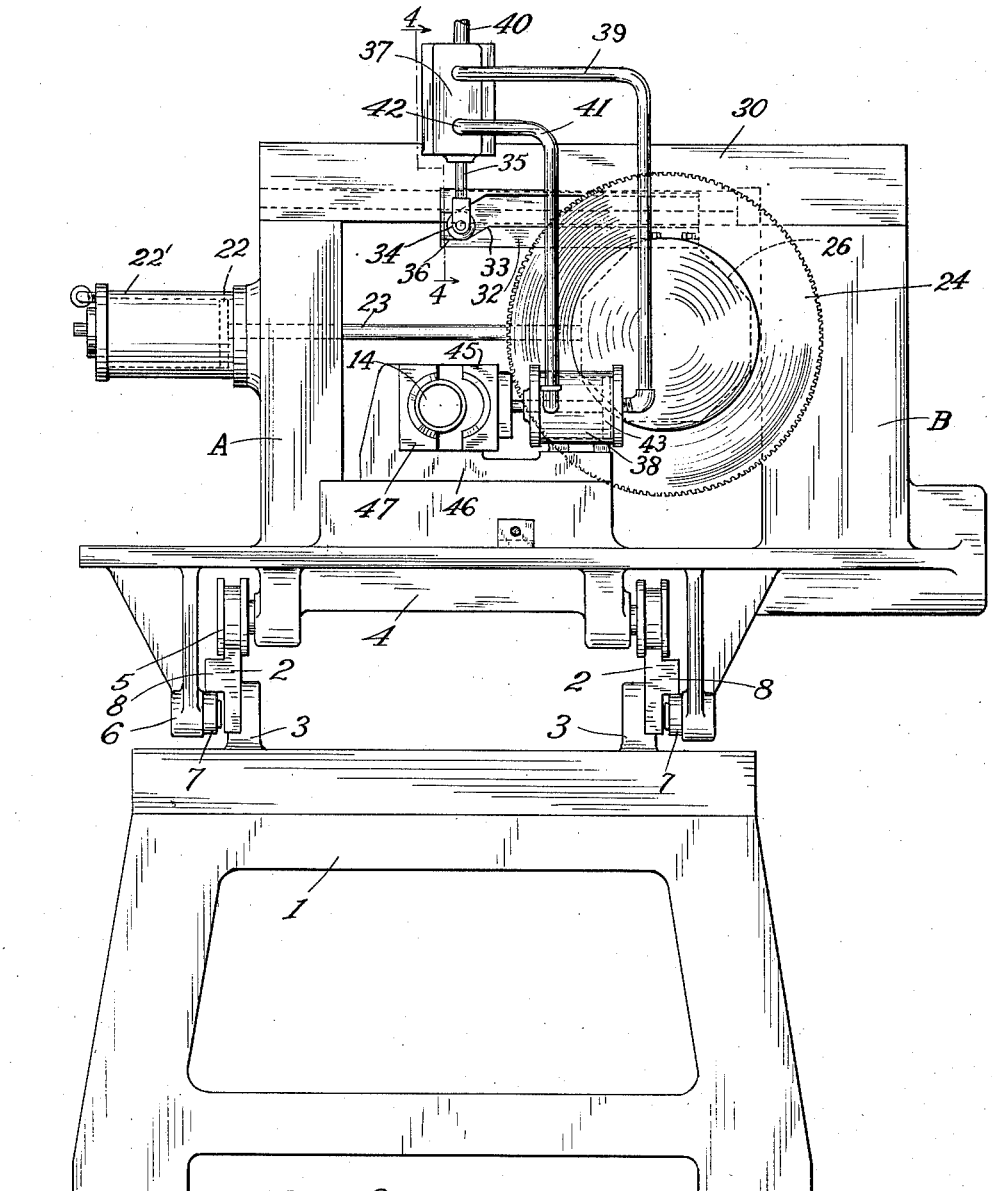
Fig. 3 is an enlarged end elevation of the same.
Figure 4:
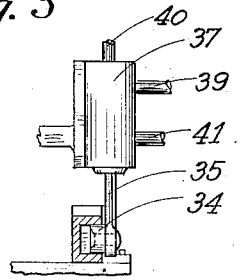
Fig. 4 is a section on line 4—4 of Fig. 3.

In the drawings, in which I have illustrated one embodiment of my invention, I provide a suitable base 1 upon which the rails 2 are mounted by means of brackets 3. A carriage 4 is supported by rollers 5 upon the rails 2 and is provided with depending brackets 6 which carry the rollers 7. The rollers 7 engage the under surfaces of the extensions 8 of the rails 2. This is illustrated more clearly in Fig. 3 and provides means for movably supporting the carriage but at the same time preventing tipping of the carriage when the severing means is under load.

Slidably supported at one end of the base 1 in a bracket 9, is a trip rod 10. A tube engaging sheave 11 is adjustable on the rod 10 by means of a set screw 12 and is provided with a tube end engaging target 13 which extends into the path of movement of the tube 14. A suitable bearing 15 supports the opposite end of the rod 10. This end of the rod 10 is connected to the carriage 4 through a pivoted link 16 and arm 16'. A valve rod 17 is connected to the link 16 at one end and operates a valve within the casing 18 to admit fluid under pressure from the supply pipe 19 to either one of conduits 20 or 21. I have provided a spring 5 connecting the link 16 with the carriage 4. This spring normally pulls the link 16 toward the casing 18. A piston 22 is movable within the cylinder 22' and is connected by means of a connecting rod 23 to the housing 26. The cross arm 30 is supported by standards A and B and is grooved at 31 to receive a key formed on the slide block 32 and from which the saw unit is suspended, permitting transverse movement of the saw unit with respect to the tube 14. The circular saw 24 is secured to one end of the shaft 25 which is suitably supported in the housing 26. A pulley 27 may be secured to the other end of the shaft for connection with a service of power, or if desired a motor may be housed within the housing having a shaft 25. The slide 32 is grooved to receive a roller 34 carried by the valve rod 35. The groove at its forward end presents a flat roller engaging surface 36. The roller 34 which travels in the groove ascends the incline 33 when the saw is moved to the left in Fig. 3 and operates the valve in the cylinder 37 to connect the conduit 39 with the source of fluid pressure through the port 40. Fluid pressure is thus communicated against the right hand face of the piston 43 as shown in Fig. 3, to force the piston and the clamping die 45 to the left. A fixed die 47 is secured to the base 46. A conduit 41 connects the cylinder 38 with the valve cylinder 37 and when the roller travels down the incline 33, the slide valve communicates fluid pressure from the port 40 through conduit 41, to the opposite end of the cylinder 38 and against the opposite face of the piston 43 returning it and the die 45 to the position in Fig. 3. The clamping dies 45 and 47 are grooved respectively to receive and grip a tube 14, the die 47 being preferably fixed to the base 46 on the side of tube 14 opposite the saw 24 to resist the pressure exerted by the saw on the tube. A moving tube clamped between the die will carry with it the carriage 4 and the superstructure thereon, so that there will be no relative longitudinal movement between the carriage and the tube during the severing operation.

It will be noted that I have arranged the tripping mechanism to operate the valve within the cylinder 37 just subsequent to the beginning of movement of the saw unit toward the tube, and that before the saw comes into contact with the tube the clamping die 45 will be thrust toward the clamping die 47 to securely grip the tube and to permit the carriage and its superstructure to move as a unit with the tube. I have provided means to return the carriage to its initial position after the tube has been severed including a cable 51 passing over suitable pulleys 52 and connected at its free end to the carriage 4 and having a counter weight 50 attached to its other end.

In use, my invention operates substantially as follows:

Tubing which is fed from a former, rolling mill welder or other apparatus, moves toward and between the spaced clamping dies 45 and 47 until the end of the tubing abuts the previousy adjusted target 13. As the tube continues to move, the target 13 and the rod 10 to which it is secured, are caused to move to the left in Figs. 1 and 2, shifting the valve within the casing 18 to permit fluid pressure to be communicated through the conduit 21 to one side of the piston 22, forcing the piston, the rod 23 and the saw 26 to the left in Fig. 3. During movement of the saw and the arm 32 to the left, the inclined surface 33 will pass under the roller 34 and move it upwardly toward the casing 37. The valve in the casing is then operated to communicate fluid pressure from the conduit 40, through the conduit 39 to one side of the piston 43, forcing the piston to the left in Fig. 3 and with it the movable clamping die 45. As the die piece 45 approaches the fixed die 47, it engages the walls of the continuously moving tube under pressure and securely clamps the same between the die pieces. In this manner the carriage 4 and the superstructure thereon is moved. It will be noted that the dies securely grip the tube before the saw advances sufficiently to engage the tube. As the saw unit continues to move to the left in Fig. 3 it comes into engagement with the tube, the stroke of the piston 22 being sufficient to permit the saw to cut completely through the tube. The severed end of the tube falls down and may be removed from the apparatus by the operator. As the severed end of the tube is released the rod 10 is no longer forced to the left and the spring 5 pulls the link 16 and the rod 17 toward the valve casing 18 shifting the valve within the casing so that fluid pressure is communicated from the supply conduit 19 through the conduit 20 to the opposite face of the piston 22 forcing the piston and consequently the saw connected to it, to the right in Fig. 3 out of engagement with the tube. As the saw unit moves to the right the grooved arm 32 moves with it and the roller 34 rides down the incline 33. This downward movement of the roller and rod 35 shifts the valve within the casing 37 so that fluid pressure is communicated from the supply conduit 40 through the conduit 41 to the opposite face of the piston 43 returning it to the position in Fig. 3 and spacing the dies 45 and 47. The grip on the moving tube is thus released permitting the counter weight, which has been raised during the movement of the carriage, to lower itself and return the carriage to its initial position. This cycle of operation is repeated as the moving tube passes through the spaced dies and again engages the target 13.

It will be noted that the saw is moved entirely out of engagement with the tube prior to the spacing of the dies thus preventing breakage of the parts due to relative longitudinal movement of the saw and the tube.

It is obvious that by adjusting the target 13 to various positions along the rod 10, the device will sever a continuously moving tube into a number of desired uniform lengths. If desired, graduations may be formed on the rod 10 to assist the operator in placing the target at a desired position to cut sections of tubing to desired lengths.

It will be seen from the foregoing description that the invention operates automatically for cutting tubes into desired lengths, suitable fluid pressure operated means being provided, for moving the cutting means simultaneously with the tube during the cutting operation enabling a perfect cut to be made, while the tube is in motion, and eliminating breakage of the saw and other parts which might occur if relative longitudinal movement between the tube and the saw existed while the saw is in the path of movement of the tube. Breakage of the saw and other parts is also prevented by the use of fluid under pressure. If the saw stops for any reason the flexible nature of the fluid under pressure will prevent it from being forced or jammed into the tube.

Various changes in the details of construction of my invention may be made without departing from the spirit of the invention or the scope of the appended claims.

I claim:

1. A flying saw cut off for axially moving tubing comprising a carriage movable longitudinally of the tube to be severed, tube clamping dies on the carriage, a rotatable saw mounted on the carriage for yieldable movement transversely of the tube, means for clamping the dies about the tube, and fluid pressure means for moving the saw transversely across the tube, means controlled by movement of the tube for imparting transverse movement to the saw, and means controlled by the transverse movement of the saw for actuating said clamping means.

2. A flying saw cut off for axially moving tubing comprising a carriage movable longitudinally of the tube to be severed, tube clamping dies on the carriage, a rotatable saw mounted on the carriage for movement transversely of the tube, and fluid pressure means for moving the saw transversely across the tube, and fluid pressure means for clamping and unclamping the dies about the tube, the last said means being controlled by the transverse movement of the saw.

3. A flying saw cut off for axially moving tubing comprising a carriage movable longitudinally of the tube to be severed, tube clamping dies on the carriage, a rotatable saw mounted on the carriage for movement transversely of the tube, and fluid pressure means actuated by movement of the tube for moving the saw transversely across the tube, and fluid pressure means for clamping and unclamping the dies about the tube, the last said means being controlled by the transverse movement of the saw.

4. A flying saw cut off for axially moving tubing comprising a carriage movable longitudinally of the tube to be severed, a rotatable saw mounted on the carriage for movement transversely of said tube, fluid pressure means for moving said saw, means adapted to be actuated by the tubing for controlling said fluid pressure means, dies also mounted on the carriage for clamping and holding the tube during the cutting operation, fluid pressure means for operating said dies, means actuated by the transverse movement of the saw for controlling said latter fluid pressure means, and means for returning said carriage to its starting point after the cutting operation.

5. A flying saw cut off for axially moving tubing comprising a carriage adapted to be advanced by said tubing, a guide rigidly mounted on the carriage transverse to the line of travel of said tubing, a saw movably mounted on said guide, resilient fluid pressure means mounted on and movable with the carriage for advancing and retracting said saw on said guide, tube clamping members also mounted on said carriage, a valve for admitting fluid to said fluid pressure means having control mechanism actuable by the movement of the tubing, and fluid pressure means controlled by the advancing and retracting movement of the saw for operating said tube-clamping members.

6. A flying saw cut off for axially moving material comprising a carriage movable longitudinally with the material to be severed, a saw mounted on the carriage, a fluid pressure cylinder and piston for advancing the saw into operative yielding engagement with the material, a valve for controlling admission of fluid under pressure to said cylinder, means adapted to be engaged by the material for operating said valve, clamping members mounted on and movable with the carriage, means for actuating said clamping members, said actuating means being rendered operative by the movement of the saw toward the material to cause the clamp members to grip the material and move the carriage therewith while being severed by the saw.

In testimony whereof I hereunto affix my signature this 7th day of November, 1927.

CARL A. BRAUN.